Jan. 13, 1959

B. HARRIS ET AL 2,868,975

PHASE COMPARISON SYSTEM

Filed April 1, 1954

INVENTORS
Bernard Harris
& Albert Macovski

BY [signature]
ATTORNEY

United States Patent Office 2,868,975
Patented Jan. 13, 1959

2,868,975

PHASE COMPARISON SYSTEM

Bernard Harris, Bronx, and Albert Macovski, Massapequa, N. Y., assignors to Radio Corporation of America, a corporation of Delaware Application April 1, 1954, Serial No. 420,240

9 Claims. (Cl. 250—36)

The present invention relates to improvements in electrical phase detection and phase comparison circuits, and more particularly, although not necessarily exclusively, to electrical phase comparison circuits of the balanced variety embodying a semiconductor amplifier device connected for a substantially symmetrical type of operation.

More directly, the present invention relates to improvements in electrical phase comparison circuits involving semi-conductor amplifier devices of the type disclosed and claimed in a copending United States patent application by George C. Sziklai, Serial No. 320,712, filed November 15, 1952, entitled "Phase Comparison."

As described in the above-identified Sziklai application, there are many instances, particularly in electrical signaling systems, where there is a need for a phase comparing circuit capable of detecting the sense and magnitude of phase difference between two electrical signals. In one common type of phase comparison circuit, a local controllable wave is compared in phase with a standard or fixed reference wave to develop a control signal which may be applied to control the generation of the local wave so as to bring it into synchronous frequency or phase relationship with the standard reference wave. Examples of this type of circuit action may be seen in automatic frequency control systems used for synchronizing the line deflection circuits in television receivers, a commercial embodiment of such a circuit being illustrated in an article by E. L. Clark, entitled "Automatic Frequency Phase Control of Television Sweep Circuits" in the May 1949 issue of "Proceedings of the I. R. E." commencing on page 497.

Phase comparison circuits, of course, find many other applications, such as in the automatic frequency control of the local oscillator in a superheterodyne receiver, such that otherwise undesirable shifts in the local oscillator frequency due to line voltage changes, etc., may be avoided.

Prior to the disclosure of the above-identified Sziklai U. S. patent application, a most common form of phase comparison circuit involved the use of two diodes connected in a bridge relation across one source of signal to be compared. The other signal to be compared was in turn fed across the other diagonal of the bridge. The difference in phase between the two signals thus compared was manifested in a change in the average signal current flow through one branch of the bridge which could be detected and employed for control purposes. Sziklai then contributed to the art by teaching how a bidirectional semiconductor type amplifier could be employed to accomplish with very little circuitry what was theretofore possible through the use of at least two separate diode elements and other circuit complexities. By using a semiconductor amplifier device having substantially symmetrical output and input characteristics whereby the roles of the input and output electrodes in junction relation to a base electrode can be interchanged with no practical change in circuit operating conditions, Sziklai shows that one signal to be compared may be applied to the base electrode of the transistor while the other signal to be compared may be applied across the other two electrodes. Direct current flow between these latter two electrodes is then shown to be a measure of the phase difference between the signals to be compared with the electrical sense of the average current flow bearing information as to the sense of the phase difference between the signals.

It is generally important in phase detector circuits that an error voltage be developed only when and if both signals to be compared are present, that is to say, a given phase comparator circuit should be so balanced that the cessation of one of the signals to be compared, especially the standard or sync signal, as it is called in television deflection AFC systems, does not produce a false error voltage indicating a phase difference that may not exist. When a semiconductor amplifier or transistor is caused to form the basis of a balanced phase detector circuit, as shown for example by Sziklai above, this problem becomes rather troublesome. Even assuming that the transistor used is perfectly symmetrical, experience shows that the source impedance of the signal applied to the base electrode of the transistor causes an inherent amount of circuit unbalance which in the absence of base electrode signal causes the development of an undesirable error voltage.

In accordance with the present invention, a phase detector circuit is provided embodying a semiconductor amplifier device having a base electrode and two other operating electrodes cooperatively associated therewith. A first set of signals to be compared is applied between the base electrode and one operating electrode. The other set of signals to be compared is applied between the first and second operating electrodes. A galvanically nonconducting balancing impedance is then connected between one operating electrode and the base electrode. The characteristic of this balancing impedance is made to correspond to the effective source impedance of the signal applied to the base electrode, as explained more fully hereinafter. In this way, the magnitude and polarity of an output error signal derived from an output circuit connected between the two operating electrodes is made, according to the present invention, to correspond to a zero phase difference datum value, upon the conditional absence of the first set of signals.

It is, therefore, an object of the present invention to provide an improved phase comparison apparatus.

Another object of the present invention is to provide simplified apparatus for accurately detecting phase differences between electrical waves applied thereto.

A further object of the present invention is to provide an improved system for indicating the magnitude and sense of a phase difference conditionally existing between two electrical signals.

Another object of the present invention is to provide an improved phase comparison apparatus embodying a semiconductor amplifier device.

Still another object of the present invention resides in the provision of a novel semiconductor balanced phase detector system in which unbalance in circuit performance, due to either unbalance in the semiconductor amplifier or the finite source impedance of the signals applied to the detector, is overcome.

It is another object of the present invention to provide an automatic frequency control signal comparator circuit in which the frequency corrective voltage developed by the system is virtually zero for the condition of synchronization of the apparatus being controlled.

It is further a general object of the present invention to provide an improvement on the phase comparator circuit disclosed in copending United States patent application, Serial No. 320,712, filed November 15, 1952, by George C. Sziklai, entitled "Phase Comparison."

A more complete understanding of the present invention, as well as other advantages and features thereof, will be obtained from a reading of the following specification, especially when taken in connection with the accompanying drawings, in which.

Figure 1:
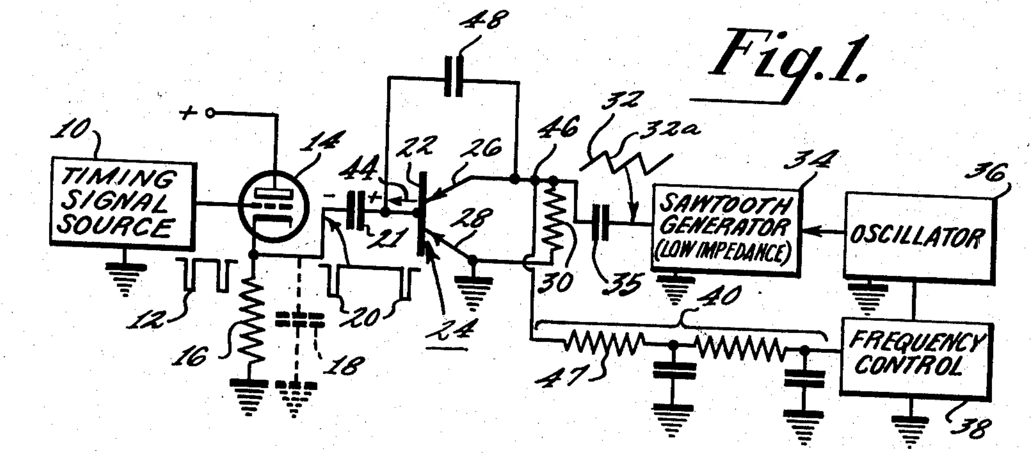
Figure 1 is a block and schematic representation of an automatic frequency control system embodying the novel features of the present invention.

Turning now to Figure 1, there is illustrated in block form at 10 a source of standard timing signal having a waveform shown at 12. As will become more apparent hereinafter, although the timing signal 12 has been shown as being pulselike in form, the successful practice of the present invention is in no way limited to this particular wave configuration. The timing signal 12 is conveyed to the control electrode of an amplifier 14 which, by way of example, has been shown as being of the cathode follower variety with an output load resistor 16 connected between the cathode of tube 14 and circuit ground. Stray and/or lumped circuit capacitance which may appear across the load resistor 16 is indicated by the dotted line capacitor 18. The purpose of the cathode follower tube 14, as discussed hereinafter, is to ensure a relatively low impedance source of timing signal for the phase comparator circuit to be described. The timing signal as delivered by the cathode follower has been indicated by the waveform 20.

Means such as the capacitor 21 are then provided for coupling the timing signal 20 to the base electrode 22 of a semiconductor amplifier 24. The semiconductor amplifier 24, which may take the form of a symmetrical transistor, comprises a base electrode and at least two operating electrodes 26 and 28 in cooperative relation to the base electrode. By way of example, amplifier 24 may be of the transistor junction variety in which the operating electrodes 26 and 28 are connected with separate zones of semiconductor conductivity in junction relation to a base zone to which the base electrode 22 is connected. For purposes of illustrational convenience a P–N–P type transistor action will be assumed for the amplifier 24.

In the following description of the present invention, it will be assumed that the electrical characteristics of each of the operating electrodes with respect to the base is substantially the same whereby either of the operating electrodes may serve as emitter or collector depending upon the relative polarity each operating electrode holds with respect to the base electrode. Such a semiconductor amplifier is known in the art as a symmetrical unit. Since in a symmetrical unit either of the operating electrodes may operate as an emitter or collector, it is appropriate to term the operating electrodes "committers." It is in this sense that the term "committers" will be used throughout this specification and claims. With this understanding, quotation marks will not be used hereafter, presenting this term.

A suitable load resistor 30 may, if desired, be connected between the committers 26 and 28. The signal whose phase is to be compared with the standard timing signal is shown by way of example, at 32. Although the signal 32 is for purposes of convenience, indicated as being sawtooth in waveform it will be understood that other signal waveforms could be utilized without departing from the spirit and scope of the present invention. The waveform 32 is indicated as being developed by a sawtooth generator 34 which has a relatively low internal impedance compared to the path impedance defined by the committers of the amplifier 24. Capacitor

35 is made sufficiently large to present very little impedance to the signal frequencies comprising the sawtooth 32. The sawtooth generator 34 may in turn be controlled or timed by an oscillator 36, whose operating frequency is in turn adapted for control by a frequency control circuit 38. By way of example, the frequency control circuit may be of the conventional reactance tube variety as shown for instance, on page 655 of the Radio Engineering Handbook, by Terman, first edition, 1943. Any error voltage developed across the load resistor 30, which may be indicative of a phase difference between signal 32 and the timing signal 20 is then applied through a low-pass filter 40 to the frequency control circuit 38.

As is well known in the art, if the error signal developed across the resistor 30 accurately depicts by its polarity and magnitude the sense of, and magnitude of, the phase difference bewteen the waveform 32 and timing signal 20, the frequency control circuit 38 may be made to maintain a predetermined mode of synchronism between the waveform 32 and the timing signal 20.

The circuit thus far described in Figure 1, except for the balancing capacitor 48 of the present invention, is substantially the same as that shown in the above referenced U. S. Patent application, by George C. Sziklai. A detailed explanation of its mode of operation may be had through reference to the above Sziklai case. Its general operation may be readily seen by reference to the graphs of Figure 2. Let it be assumed that it is desirable to maintain the waveform 32 and the timing signal pulses 20 in the synchronous relation shown in Figure 2*a*. The timing signal 20 applied to the left hand terminal of capacitor 21 will tend to charge the capacitor 21 through the base of the amplifier 24 with a direction of current indicated by the arrow 44. The majority of this current may flow through either committer depending upon the potential relationships of the committers to one another and the base at the time of the pulse 20. The capacitor 21 will, during the intervals between the pulses 20, be left with the charged condition illustrated in the figure, in which the base 22 of the amplifier 24 is left positively polarized with respect to circuit ground. If the amplitude of the timing signal 20 is made greater than the peak to peak amplitude of the waveform 32, it will follow that transistor type current conduction within the amplifier 24 cannot occur except during the pulses 20. Transistor action can occur during pulses 20 only by virtue of what appears as a forward bias current through the transistor due to the charging of capacitor 21 in the amount corresponding to whatever charge has leaked off during the period between successive pulses. If during the "on" period of the amplifier corresponding to the individual pulses 20, the upper committer 26, in response to the sawtooth signal 32, tends to swing positively with respect to circuit ground and committer 28, the committer 26 will act as an emitter and committer 28 will act as a collector. This will act to charge the coupling capacitor 35 with its right hand terminal in a positive potential relation to its left hand terminal. This, of course, will leave the point 46 (or the committer 26) with a negative average potential with respect to circuit ground. On the contrary, should the instantaneous potential of the right hand terminal of capacitor 35 be negative with respect to circuit ground during the "on" time of the amplifier 24, the capacitor 35 will tend to charge in an opposite polarity relation, with the committer 26 acting as collector and the committer 28 acting as emitter. Under such conditions, the average potential of the point 46 (or the committer 26) will be positive with respect to circuit ground.

Returning now to the consideration of Figure 2*a*, it will be evident that if the timing signal pulses 20 occur during the return or "flyback" portion **32*a* of the sawtooth 32, such that the intersection of the A. C. axis 42 with the return time slope 32*a* substantially bisects in time the pulse 20, the average potential of the point 46** with respect to circuit ground will be substantially zero. This means that a substantially zero error voltage will be applied to the frequency control circuit defining the frequency of the oscillator 36. Should the phase of the oscillator 36 shift in a direction corresponding to a decrease in frequency, the waveform relation of Figure 2b will obtain. Under these conditions, it will be seen that the right hand terminal of capacitor 35 will be positive with respect to circuit ground during the "on" time of the amplifier 24, thereby resulting in a negative error voltage at terminal 46. This may be made to effect a temporary increase in the speed of oscillator 36 to correct for this phase error. Should the oscillator 36 tend to speed up to produce the phase relation depicted by Figure 2c, a positive error voltage will be developed at terminal 46 thereby tending to slow down the oscillator 36. It is thereby seen that an automatic frequency control type of operation is provided by virtue of the basic phase detecting and comparing action of the circuit, involving the semiconductor amplifier device 24.

In the practical employment of the arrangement of Figure 1, and still ignoring the capacitor 48, an error voltage will be developed at terminal 46 should the timing signal 20 be interrupted or discontinued. This comes about as follows: In the absence of a timing signal, the base 22 of the amplifier 24 may be considered as floating. Whichever of the committers 26 is then more positive with respect to circuit ground will act as an emitter in establishing transistor action within the amplifier. This again is predicated upon the assumption that the amplifier 24 expresses P–N–P type transistor characteristics. It is, therefore, apparent that in the absence of timing signal 20 the sawtooth waveform 32 will cause the capacitor 35 to swing in a positive direction with respect to circuit ground so as to charge both the capacitor 35 and the capacitor 21 with a current flow indicated by the arrow 44. This occurs with the committer 26 acting as an emitter and the committer 28 acting as a collector. As the sawtooth waveform signal 32, supplemented by the charge on the capacitor 35, causes the committer 26 to swing negatively with respect to circuit ground, the committer 28 assumes control as emitter. This establishes a very low impedance path between the committer 28 and the base 22 tending to discharge the capacitor 21. Successive positive going excursions of the sawtooth signal 32, therefore, will only tend to produce a negative error voltage at the terminal 46 which results from the charging of the capacitor 21 through capacitor 35 and discharging of capacitor 21 through the committer 28.

The negative error voltage appearing at terminal 46 resulting from this action is highly undersirable, since it tends to establish the operating frequency of the oscillator 36 at a value greatly displaced from the timing signal 20, when and if it again is applied to the base. Such would cause the circuit to demand a considerable time for readjustment and resynchronization upon reestablishment of the timing signal 20.

In accordance with the present invention, a balancing capacitor 48 is provided connected between that committer which directly receives the signal to be compared and the base electrode 22. In Figure 1 the balancing capacitor 48 is connected between the committer 26 and the base 22. An analysis of the circuit action under these conditions will reveal that the effect of capacitor 48 is to produce an error voltage at terminal 46 which is opposite in polarity to that produced by the capacitor 21. In other words, during negative excursions of the sawtooth signal 32, the committer 28, acting as emitter will provide a charging path for capacitor 48 in the direction of the arrow 44. During the positive excursions of the sawtooth 32, as above described, the committer 26 will act as an emitter, thereby tending to discharge the capacitor 48 through the relatively low impedance emitter-base path of the amplifier 24. The net effect of capacitor 48 will, therefore, be to develop a positive error voltage at terminal 46 in the absence of timing signal 20. In accordance with the present invention, therefore, the value of capacitor 48, for symmetrical amplifier units, is made equal to the effective value of capacitance between the base 22 and committer 28 as defined or caused by the total circuit impedance, including the source of timing signal driving the base.

The utilization of the capacitor 48 which acts as a balancing impedance or balancing capacitance means, is seen as very important in realizing optimum performance from the semiconductor amplifier type phase comparator circuit shown. For example, to avoid excessive unbalance in the circuit of Figure 1 if the balancing capacitor 48 were not employed, it would be necessary to reduce the coupling capacitor 21 to a rather low value comparable to the interelectrode capacitance between the committer 26 and base 22. Under these conditions it is problematical whether sufficient charging current would be demanded by the capacitor 21 to forwardly bias the transistor 24 into an adequate collector current for charging the capacitor 35. Moreover, as the value of the capacitor 21 is reduced, the rather low impedance of the base input to the amplifier 24 tends to produce sync crushing and consequent phase shift of the deflection action. Through the use of the balancing capacitor 48, the coupling capacitor 21 may be made sufficiently large to ensure adequate base current for the amplifier 24, thereby affording a sufficiently low "on" impedance for the committer 26 in charging the capacitor 35. It is important that the source of the timing signal be kept of sufficiently low impedance to prevent integration of the timing signal with an accompanying phase shift in the synchronizing action imposed on the oscillator 36.

In some cases it may be possible to increase the value of the coupling capacitor 21, in the arrangement of Figure 1, to a point where the reactance of the lumped circuit capacitance 18 is higher than the coupling capacitor 21. This assumes, of course, that the output impedance of the cathode follower 14 is higher than would normally be used under most applications. Under these conditions, the value of the balancing capacitor 48 would be made more nearly comparable to the value of the lumped circuit capacitance 18.

Figures 2, 3:
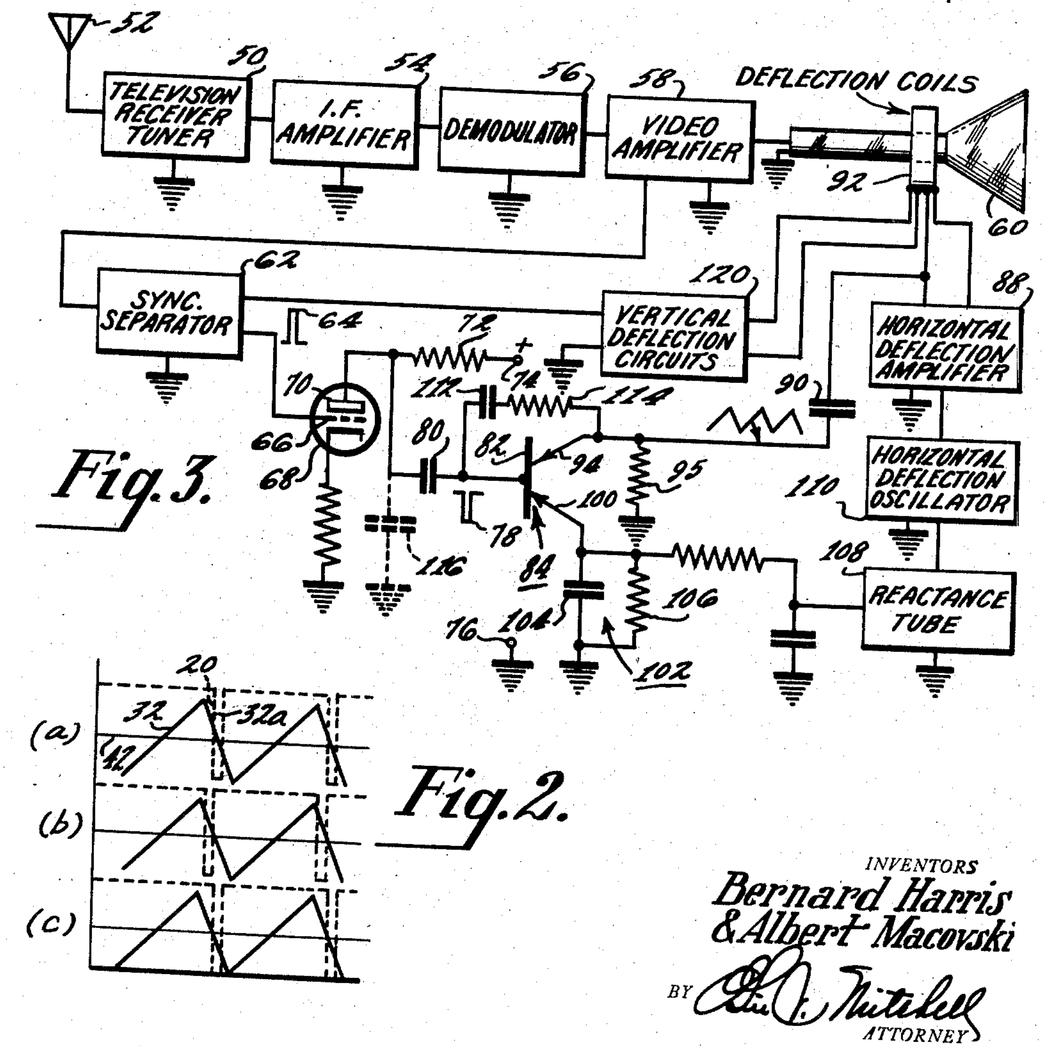
Figure 2 is a graphical illustration of examplary signal relationships which may be encountered in the practice of the present invention.
Figure 3 is a combination block and schematic diagram of a television receiver provided with an automatic frequency control circuit embodying the noval features of the present invention for controlling the cathode ray beam deflection rate of the receiver.

The embodiment of the present invention shown in Figure 3 is substantially the same as that shown in Figure 1, with the exception that the automatic frequency control circuit is shown in operating connection with the horizontal deflection circuit of a television receiver. Moreover, the polarity of the sawtooth signal employed in Figure 3 is opposite to that employed in Figure 1.

In Figure 3 a television receiver tuner 50 is shown adapted to receive radio signals from an antenna 52. Output signal from the tuner 50 is applied in a conventional manner to an intermediate frequency amplifier 54 which is in turn coupled to a signal demodulator 56. A video amplifier 58 is then fed by demodulated video signal provided by the demodulator 56. Output signal from the video amplifier 58 is applied to the kinescope 60 for modulation of the cathode ray beam therein. The demodulated video signal is also extracted from the video amplifier 58 and applied to a conventional form of sync separator circuit 62. Separated sync 64 is then applied to the control electrode 66 of a sync amplifier tube 68, whose anode 70 is connected through a load resistor 72 to a source of anode supply potential having a positive terminal at 74. The negative terminal of the anode supply source is shown grounded at 76. Negative going separated and amplified synchronizing signal 78 is capacitively coupled via the capacitor 80 to the base electrode 82 of a semiconductor type amplifier 84. The amplifier 84 is shown purely by way of example as being of the same general type as the amplifier 24 in Figure 1. A sawtooth deflection signal for comparing with the incoming sync may be conveniently derived from the output circuit of a horizontal deflection amplifier 88. To illustrate this, a capacitor 90 is shown connected from one terminal of the horizontal deflection coil winding within the deflection yoke 92 to the committer 94 of the amplifier 84. Sawtooth signal illustrated by the sawtooth signal waveform indicated on the lower plate of capacitor 90 may be seen to be of an opposite polarity to that shown at 32 in Figure 1.

In the arrangement of Figure 3, in contradistinction to the circuitry of Figure 1, the committer 100 of Figure 3 is connected with circuit ground through a time constant load circuit 102 comprising the capacitor 104 and resistor 106. The position of the circuit 102 applies a somewhat stabilized bias voltage to the committer 100 and at the same time permits the developed bias to be used as a control voltage for the reactance tube circuit indicated at 108. The reactance tube 108 is in turn coupled with a horizontal deflection oscillator 110, which in a conventional manner, is directed to drive the horizontal deflection amplifier 88. An analysis of the circuit of Figure 3 will reveal that the sense of the correction voltage developed across the time constant network 102 is the same as that developed at point 46 for a given phase difference between the sawtooth signal 98 and the separated synchronizing signal 78, even though the sawtooth signal 98 is of opposite polarity to that used in Figure 1.

To achieve the balancing effect of the present invention in the arrangement of Figure 3, in order that a net error voltage will not be applied to the reactance tube 108 in the absence of received synchronizing signal, a complex impedance comprising capacitor 112 and resistor 114 is connected between the committer 94 and the base 82. In Figure 3 the source of the synchronizing signal 78 is not illustrated as being a cathode follower type amplifier but an amplifier having a much higher output impedance. Stray circuit capacitance 116 may be the highest capacitive reactance in the path between the base 82 and the committer 100. If the reactance of the capacitance 116 is much lower than the resistance value of the load resistor 72 (taken in parallel combination with the anode resistance of tube 68) and capacitor 80 is relatively high with respect to the value of the capacitance 116, balance will be obtained when the capacitor 112 is approximately equal to the capacitance 116. On the other hand, if the parallel combination of the load resistor 72 for the sync amplifier tube 68 along with the anode resistance of tube 68 itself is relatively low, capacitors 80 nd 112 may be made relatively high in value and resistor 114 made approximately equal in value to the parallel combination of the load resistor 72 and the tube anode resistance. In general, the complex impedance between the committer 94 and the base 82 should be substantially equivalent in impedance magnitude or value and reactance characteristics to the complex impedance between the base 82 and the committer 100 to achieve the balanced conditions taught by the present invention.

In Figure 3 a conventional form of vertical deflection circuits for the kinescope 60 is indicated as being provided by the vertical deflection circuits 120. Separated vertical sync from the sync separator 62 is applied to the deflection circuits 120. Output signal from the vertical deflection circuit is shown applied to the deflection yoke 92.

Purely by way of illustration, and with no intention of limiting the practice and scope of the present invention, the following examplary circuit values are given for the embodiments of the present invention shown in Figures 1 and 3. Although the circuit values to be given have been found to give good results in the practical application of the present invention, to home type television receiving equipment, it will be understood that other circuit values falling within the scope of the present invention, as described hereinabove and claimed more fully hereinafter, may be used with equally satisfactory results:

For convenience, condensers will be designated as "C" and resistors by "R," each followed by the index number assigned to such elements in the drawing.

*In Figure 1.*—Amplifier 24—A transistor type TA–211, selected for maximum symmetry

| | | |
|---|---|---|
| C21 and C48 | μμf | 180 |
| C35 | μf | .05 |
| R30 | ohms | 200,000 |
| R47 | do | 100,000 |

*In Figure 3.*—Amplifier 84—A transistor type TA–211, selected for maximum symmetry

| | | |
|---|---|---|
| C80 and C112 | μf | .01 |
| R72 | ohms | 50,000 |
| R114 | do | 20,000 |
| R95 | do | 10,000 |
| C90 | μf | .05 |
| C104 | μf | .05 |
| R106 | ohms | 200,000 |

It will be apparent that after having benefited from the above teaching, that should the symmetry of a particular transistor type amplifier unit be imperfect, the above principles of the present invention may still be practiced. However, the balancing impedance connected from committer to base to correct for the characteristic impedance of the base driving signal source may have to be tailored by slightly increasing it or decreasing it in a manner complementary to the particular type of unbalance in the basic symmetry present in the semiconductor amplifier. In practice, however, the amount of dissymmetry present in commercially available symmetrical type transistors is so slight tht the amount of error voltage developed by this basic dissymmetry is second order in nature and little if no deviation from the above discussed ideal balance conditions need be made.

What is claimed is:

1. In an electrical system including a first source of signals and a second source of signals independent of said first signal source, apparatus for detecting the conditional difference in phase between the signals from said two sources comprising the combination of: a semiconductor amplifier device having a base electrode and a first and a second operating electrodes cooperatively associated therewith; means for applying said first source signals between said base electrode and the first of said operating electrodes, said first source taken with said applying means exhibiting a predetermined driving impedance value and characteristic as viewed from said base electrode; means for capacitively coupling said second source of signals between said first and second operating electrodes; means coupled with said operating electrodes for developing an indicating voltage in response to current flow between said operating electrodes, said indicating voltage representing the phase relation between the signals delivered by said first and second source of signals; and a balancing impedance means exclusive of said indicating voltage developing means connected between said second operating electrode and said base electrode, the electrical characteristics of said balancing impedance being substantially identical to said base driving impedance.

2. In an electrical system including a first source of signals having a finite impedance and a second source of signals independent of said first signal source, apparatus for detecting the conditional phase difference between signals from said two sources; a transistor amplifier device of the symmetrical junction variety having a base zone electrode, a first junction zone electrode and a second junction zone electrode; driving coupling means placing said first source of signals effectively between said base electrode and said first electrode, said coupling means and said first source in combination exhibiting a finite driving impedance for said transistor; coupling means placing said second source of signals effectively between said first and second junction zone electrodes; means coupled with said first and second junction zone electrode and responsive to current flow therebetween for developing an indicating voltage representing the phase relation between the signals delivered from said first and second signal sources; and a balancing impedance exclusive of said indicating voltage developing means connected between said base electrode and said second junction zone electrode, the value and character of said impedance being substantially identical to the driving impedance exhibited by said first signal source and related driving coupling means.

3. An electrical system according to claim 2 wherein said driving coupling means comprises a capacitor sufficiently small to cause said transistor driving impedance to appear predominantly capacitive in nature and wherein said balancing impedance comprises a capacitor of a value substantially equavalent to the capacitive value of said driving impedance.

4. In an electrical phase comparator circuit, the combination of: a first two terminal source of electrical signals having a relatively low output impedance value; a second two terminal source of electrical signals independent of said first signal source whose phase relative to signals from said first source is to be compared; a semiconductor amplifier having a base electrode, a first operating electrode and a second operating electrode, said operating electrodes being cooperatively associated with said base electrode; a first capacitor connected between one terminal of said first signal source and said base electrode; a connection from the other terminal of said first signal source and said first operating electrode; a connection from said first operating electrode and one terminal of said second signal source; a second capacitor connected from the other terminal of said second signal source to said second operating electrode; impedance means connected between said first and second operating electrodes for developing an output signal indicative of the phase relation between said signals; and a third capacitor exclusive of said impedance means connected between said second operating electrode and said base, the value of said capacitor being of the same order of magnitude as said first capacitor.

5. In an electrical phase comparator circuit, the combination of: a first two terminal source of electrical signals having a relatively low output impedance value; a second two terminal source of electrical signals independent of said first source of signals whose phase relative to signals from said first source is to be compared; a semiconductor amplifier having a base electrode, a first operating electrode and a second operating electrode, said operating electrodes being cooperatively associated with said base electrode; said semiconductor amplifier being essentially non-symmetrical to the extent that conditional conductivity between said first operating electrode and base is of a different value than the conditional conductivity between said second operating electrode and base; a first capacitor connected between one terminal of said first signal source and said base electrode; a connection from the other terminal of said first signal source and said first operating electrode; a connection from said first operating electrode and one terminal of said second signal source; a second capacitor connected from the other terminal of said second signal source to said second operating electrode; impedance means connected between said first and second operating electrodes for developing an output signal indicative of the phase relation between said signals; and a third capacitor exclusive of said impedance means connected between said second operating electrode and said base, the ratio of the value of said third capacitor to the value of said first capacitor being substantially equal to the ratio of the different conductivities between said operating electrodes and base.

6. In an electrical phase comparator circuit, the combination of: a first two terminal source of electrical signals having an output impedance substantially resistive in character; a second two terminal source of electrical signals independent of said first source of signals whose phase relative to signals from said first source is to be compared; a semiconductor amplifier having a base electrode, a first operating electrode and a second operating electrode, said operating electrode being cooperatively associated with said base electrode; a first capacitor connected between one terminal of said first signal source and said base electrode; a connection from the other terminal of said first signal source and said first operating electrode; a connection from said first operating electrode and one terminal of said second signal source; a second capacitor connected from the other terminal of said second signal source to said second operating electrode; impedance means connected between said first and second operating electrodes for developing an output signal indicative of the phase relation between said signals; and a combination of a resistor and third capacitor exclusive of said impedance means connected in series with one another between said second operating electrode and said base, the value of said resistor being substantially equal to the effective resistive output impedance value of said first source of electrical signals.

7. In an automatic frequency control circuit suitable for use in a television deflection system, the combination of: a source of deflection system synchronizing pulses; a deflection signal generator means productive of a sawtooth type waveform; means coupled with said generator means for controlling the frequency and phase of the sawtooth deflection signal produced thereby in accordance with a phasing control signal; a semi-conductor amplifier having a base electrode and at least a first and a second operating electrode cooperatively associated with said base electrode in a substantially symmetrical electrical manner; a first capacitance means coupling said source of deflection synchronizing signal in driving relation between said base and said first operating electrode; a second capacitance means coupling said sawtooth signal generator means in driving relation between said first and second operating electrodes; output signal load means connected between said first and second operating electrodes; coupling means connected between said load means and said generator controlling means; and a third capacitance means exclusive of said first capacitance means connected between said second operating electrode and base, the value of said third capacitance means being substantially equal to the effective capacitance value of said first capacitance means.

8. In an automatic frequency control circuit suitable for use in a television deflection system, the combination of: a source of synchronizing pulses having two output terminals; a deflection signal generator means productive of a sawtooth type waveform, said generator having two output terminals; means coupled with said generator means for controlling the frequency of sawtooth waveform produced thereby in accordance with a direct current control potential; a symmetrical semiconductor amplifier having a base electrode, a first committer and a second committer; a direct current conducting means connected between one of said synchronizing pulse source terminals and said first committer; a first capacitor connected between the other of said synchronizing pulse source terminal and said base; a direct current conducting means connected between one of said generator output terminals and said first committer; a second capacitor connected between the other generator output terminal and said second committer; direct current control potential developing means connected between said committers; direct current coupling means connected between said control potential developing means and said generator for frequency and phase control thereof; and a third capacitor exclusive of said first capacitor connected between said base and said second committer.

9. In an electrical phase comparator circuit, the combination of: a first two terminal source of electrical signals having a relatively low output impedance value; a second to terminal source of electrical signals whose phase relative to signals from said first source is to be compared; a semiconductor amplifier having a base electrode, a first operating electrode and a second operating electrode, said operating electrodes being cooperatively associated with said base electrode; a first capacitor connected between one terminal of said first signal source and said base electrode; a connection from the other terminal of said first signal source and said first operating electrode; a connection from said first operating electrode and one terminal of said second signal source; a second capacitor connected from the other terminal of said second signal source to said second operating electrode; impedance means connected between said first and second operating electrodes for developing an output signal indicative of the phase relation between said signals; and a third capacitor connected between said second operating electrode and said base.

References Cited in the file of this patent

UNITED STATES PATENTS

| | | |
|---|---|---|
| 2,645,717 | Massman | July 14, 1953 |
| 2,660,624 | Bergson | Nov. 24, 1953 |
| 2,766,380 | Kroger | Oct. 9, 1956 |

OTHER REFERENCES

"Duality as a Guide in Transistor Circuit Design" by Wallace et al., vol. 30, pp. 381–417, April 1951, published in Bell System Technical Journal.

"Transistor Circuits and Applications" by Sziklai, Electronic Engineering, vol. 25, pages 358 to 364, September 1953.